United States Patent
Van Zon

[11] 3,795,317
[45] Mar. 5, 1974

[54] SYSTEM FOR REVERSED OSMOSIS

[75] Inventor: Cornelis Van Zon, Zwolle, Netherlands

[73] Assignee: Industriele Onderneming Wavin N.V., Zwolle, Netherlands

[22] Filed: Jan. 17, 1972

[21] Appl. No.: 218,402

[52] U.S. Cl.................. 210/321, 210/336, 210/433
[51] Int. Cl............................................. B01d 31/00
[58] Field of Search.... 210/321, 433, 336, 490, 491

[56] References Cited
UNITED STATES PATENTS

| | | | |
|---|---|---|---|
| 3,581,900 | 6/1971 | Clark.................................. | 210/321 |
| 3,457,170 | 7/1969 | Havens............................ | 210/490 X |
| 3,612,281 | 10/1971 | Cheng............................. | 210/490 X |
| 3,542,204 | 11/1970 | Clark............................... | 210/490 X |
| 3,430,770 | 3/1969 | Clark et al....................... | 210/489 X |

*Primary Examiner*—Frank A. Spear, Jr.
*Attorney, Agent, or Firm*—J. Gibson Semmes

[57] ABSTRACT

A device for purifying water by means of reversed osmosis consisting of an auxiliary supporting tube provided with a fibrous layer and a membrane on its inner side and a main supporting plastic pipe provided with preferably helically extending grooves on its inner surface. A number of pipes form a unit which is connected with further units comprising a number of pipes, such that the pressure of the liquid in the tubes is maintained at a constant value.

3 Claims, 5 Drawing Figures

SYSTEM FOR REVERSED OSMOSIS

BACKGROUND OF THE INVENTION

The invention relates to a device for purifying liquids particularly water by means of reversed osmosis.

It is commonly known that in the last few years reversed osmosis for purifying sewage water in order to adapt it better for use as drinking water has attracted much notice. Such a reversed osmosis is based on the idea that water under high pressure is pressed through a supported membrane which retains impurities but lets pass the water, whereupon the water which has passed through the membrane is discharged to the supply system for pure water.

Such a method is of great importance since hereby in a simple way all kind of sewage waters can be stripped of undesired substances whilst producing drinking water which is fit for consumption. Particularly due to special cellulose-acetate membrane systems which are now available the purification of any kind of water has now become possible in principle.

The systems so far used, however, give rise to great difficulties regarding the provision of the membranes. After a lapse of time the membrane should be replaced for which job skilled labour is required.

It is obvious that this has a cost increasing effect so that the reversed osmosis is not competitive with respect to the systems so far used for obtaining drinking water from, for example, polluted river water.

SUMMARY OF THE INVENTION

It is an object of the invention to provide a device wherein in a very simple way the membranes which have become unfit can be replaced by new membranes without technically skilled staff being available.

This object is attained according to the invention by the arrangement in which a device for purifying water by reversed osmosis is provided which comprises an auxiliary supporting plastic tube which has on its inner side a layer of resilient fibrous or fabric-like material on which is disposed a membrane. The aforementioned auxiliary supporting plastic tube is supported on its outer side by a main supporting tube which, at least on its inner side, has discharge channels extending in the longitudinal direction.

Due to the use of an auxiliary supporting plastic tube provided thereon with a fibrous or fabric-like material on which is disposed a membrane, it is possible to manufacture the membranes in an entirely mechanical way and subject them to the required treatments in order to obtain the desired properties of the membrane. On the other hand, the thin, easily damaged membranes are protected in transit by the auxiliary supporting plastic tube provided on the outer side.

The use of plastic for the aforementioned auxiliary supporting tubes offers the great advantage that with a very cheap material the membranes can be conveyed without it being necessary to pre-treat the membranes at the location where the inverted osmosis treatment is to be carried out.

The device comprises advantageously additional main supporting tubes provided with wall apertures, which are enclosed within in a closed cylindrical space delimited by plastic closing plates at the two ends, while through apertures in these closing plates the plastic supporting tubes protrude in a perfectly sealing way with respect to the outer side.

In this way a very great quantity of water can be purified when it is ensured that in the wall of the main supporting tube openings are provided which open into the space enclosed by the closing plates and containing more tubes.

SURVEY OF THE DRAWINGS

FIG. 1 represents a cross section of a device adapted to the reversed osmosis system according to the invention;

FIG. 2 is a diagram of an apparatus for making an auxiliary supporting plastic tube which is provided with the membrane and a paper tube as supporting material, FIG. 3 is a unit comprising various reversed osmosis systems, according to FIG. 1 in which the securing of a main supporting tube is shown, FIG. 4 represents diagrammatically a number of devices for reversed osmosis according to FIG. 1 for obtaining a desired flow, and FIG. 5 is a section in the longitudinal direction through a part of a reversed osmosis system according to the invention.

DESCRIPTION OF PREFERRED EMBODIMENTS

Figure 1:
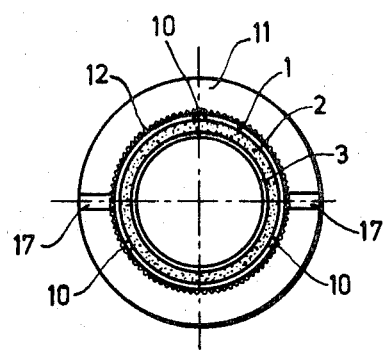

In FIG. 1 is represented a device for carrying out a reversed osmosis comprising an auxiliary supporting plastic tube 1, e.g. of polyvinylchloride 0.3 mm thick, the smooth tube 1 on its inner side being provided with a layer of paper fibres 2 on which a cellulose-acetate membrane 3 is deposited. Instead of the paper fibres 2 also glass fibres or nylon tube can be applied. The paper fibres can be provided by winding, whilst applying glue via a roller 9, a paper tube 2 from a paper sheet coming from the supply roll 7, the paper tube being pressed into the auxiliary supporting tube. This will, however, depend on the circumstances under which the device is used.

Figure 2:
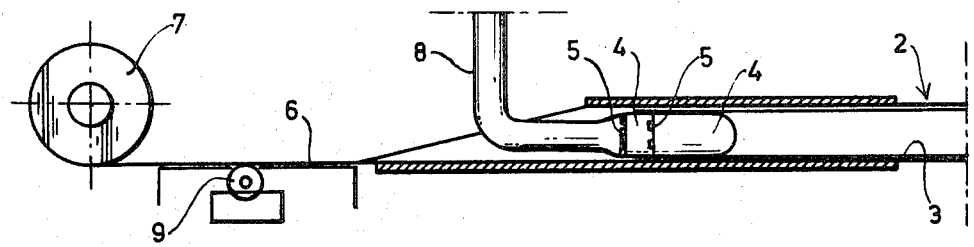

On the paper, the glass fibres or nylon hose 2 is deposited, as shown in FIG. 2, a cellulose-acetate membrane 3. This is accomplished by drawing through the tube a torpedo-shaped body 4 provided with apertures 5 through which cellulose-acetate supplied via feed pipe 8 is caused to flow. This cellulose-acetate is left on the side of the glass fibres, paper fibres or nylon fabric 2 or similar products which is not in contact with the plastic tube so that a supported membrane 3 is obtained. This membrane 3 is then activated by subjecting it to particular washing treatments. Since the membrane 3 is very thin it may be easily damaged during transport after the so called activation. Due to the presence of the auxiliary supporting plastic tube 1 this trouble is overcome since now the membrane is protected and can remain within the plastic tube 1.

In order to allow the discharge of water, which is pressed through the membrane, apertures 10 are provided in the auxiliary supporting plastic tube 1, the apertures in a staggered pattern contributing to a fast discharge of liquid from the plastic tube 1.

The auxiliary plastic tube 1 is kept as thin as possible, since after the membrane has become unfit for continued use these tubes together with their membranes are thrown away. To provide adequate support for the membrane, the device comprises a main supporting tube 11 which is provided with grooves 12 extending in the longitudinal direction. These longitudinal grooves 12 extend parallely to the longitudinal axis of the tube or preferably helically.

When helically extending grooves are applied a very good discharge of water passed through the membrane is ensured. When the grooves extend exclusively in the longitudinal direction parallelly to the axis of the tube the discharge of water is in general slightly inferior to that obtained by using helical grooves.

Figure 3:
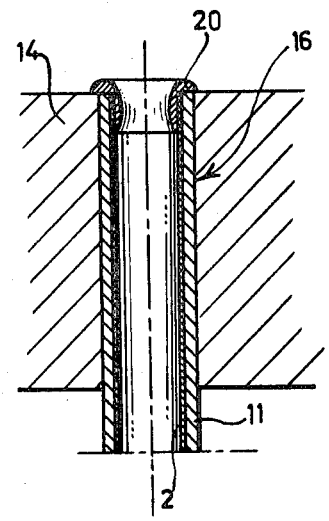

It is particularly advisable to dispose various main supporting tubes 11 with associated membrane 3 and protective auxiliary tube 1 in end plates 14 and 15, while apertures 16 are provided in these end plates through which the main supporting tubes 11 may pass. See FIG. 3. The sealing between the main supporting tubes and the end plates is such that no liquid from the space between the two end plates can issue along this connection between the end plates and the main supporting tubes and consists preferably of a glued or sealed connection.

Since the main supporting tubes are provided with bores 17 in the wall, which bores open into the space 13 between the two end plates 14 and 15, the pure water can be received outside the main supporting tubes.

A sealing ring 20 may be provided to allow a sealing connection to the supply inlet for the water.

The bores 17 have e.g. a diameter of 0.5 mm, while two bores are provided in the circumference which at intervals of 40 mm are staggered by 90°. In the supporting tube, for example 72 grooves are helically provided in the inner circumference of the tube, the main supporting tube being 3 mm thick and the pitch amounting to about 200 mm.

The discharge apertures 10 in the smooth auxiliary tube 1 have e.g. a cross section of 1 mm, while three apertures are provided in the circumference which at intervals of 25 mm are staggered by 60°.

The use of plastic tubes for the main supporting tubes 11 and the end plates 14 and 15 allows to connect in a simple way the edges of the apertures 16 in the end plates 14 and 15 with the outer side of the main supporting tube 11. With respect to metal tubes this is especially advantageous, since in metal tubes all kind of sealing rings should be provided.

A paper tube can be advantageously formed from a paper sheet 6, coming from a supply roll, by applying glue via a roller 9, this tube serving to carry the cellulose-acetate membrane after which the paper tube is slid into auxiliary tube 1. Such a way of working is advantageous in that the layer of paper on which the membrane is provided can be disposed in a simple way in the carrying tube 1. The glue used in forming the paper tube from sheets of paper is washed out on treating the membrane and is no obstacle for later treatments. For the formation of paper layers particularly kinds of paper made from rags are considered.

Figures 3, 4:
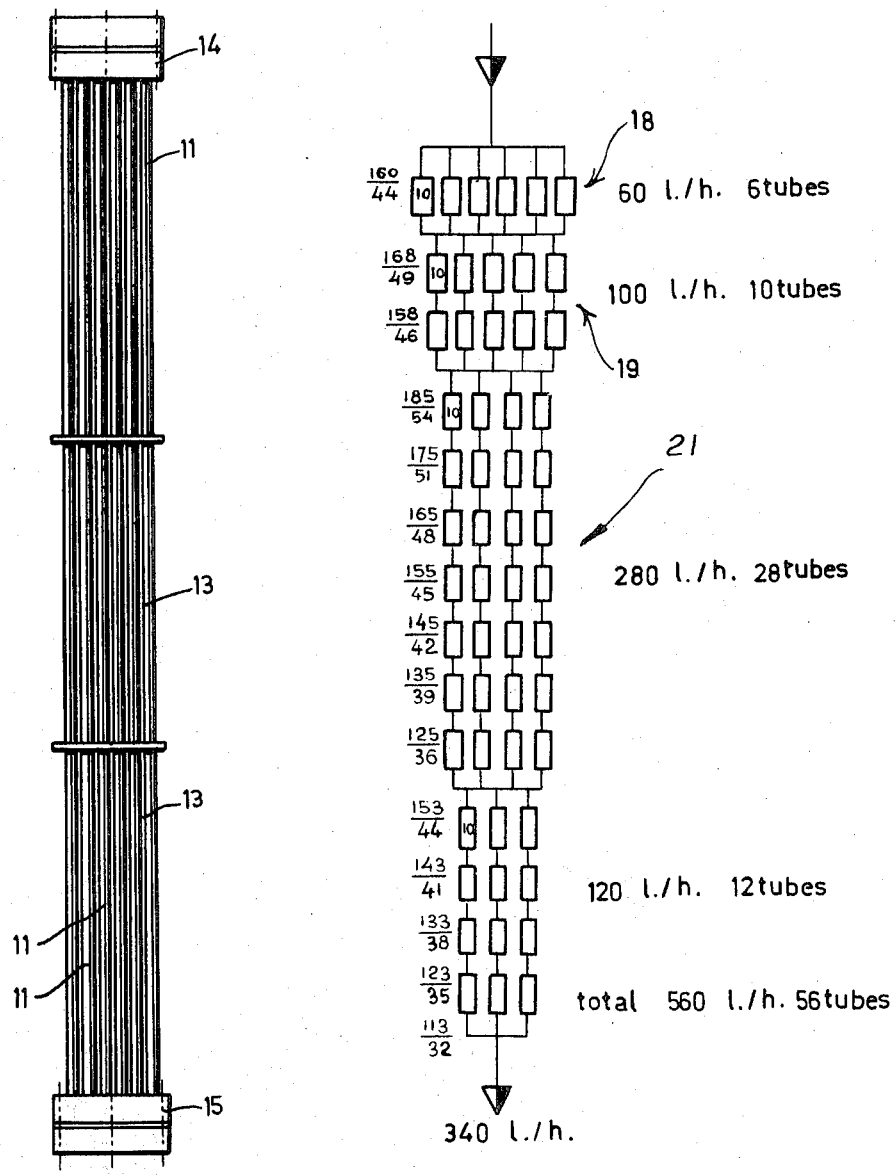

FIG. 4 represents an embodiment according to which a number of osmosis devices according to FIG. 1 are connected in parallel to thereby form a unit 18, which unit 18 is again connected in series with a next unit 19 with osmosis devices connected in parallel. It is contemplated that the number of osmosis devices according to FIG. 1 which are connected in parallel decreases per unit in the series connections in the direction of flow of the water to be purified. In this way it is possible to purify with a rather small device a large quantity of water. By applying a number of such units connected in series, each unit comprising various tubes connected in parallel, a uniform water pressure can be maintained in each unit. The effective length of the parallel tubes in each unit is varied by the use of a plurality of series of tubes, each member of the plurality being connected in parallel in each unit. For example, unit 21 includes four series of seven tubes each, each one of the four series being connected in parallel in the unit. As a result it is possible to attain with a rather small number of cocks, shut off valves and the like a proper purification of water.

FIG. 4 shows particularly the quantities of water received in each next unit when dirty water moves from top to bottom. The difference of quantity between each next unit represents the quantity of water disappeared owing to osmosis.

What I claim is:

1. A device for separating liquids by means of reversed osmosis comprising:
   A. a first rigid support tube having at least one discharge opening through the wall thereof;
   B. a layer of resilient fibrous or fabric-like material disposed around the inner surface of the first tube;
   C. a membrane of material which retains certain liquids and allows the liquid to be separated to pass, disposed around the inner surface of the layer of resilient material within the first tube; and
   D. a second rigid support tube disposed about the first tube, the second tube having at least one helical groove disposed on the inner surface thereof, whereby the fluid to be separated may pass through the membrane, the resilient layer and the first tube to be discharged from the second tube via the at least one helical groove.

2. The device of claim 1, wherein the second tube further includes at least one discharge opening through the wall thereof.

3. A device for separating liquids by means of reversed osmosis comprising:
   A. a first reverse osmosis separator unit including:
      1. a first plurality of rigid support tubes, each tube having at least one discharge opening through the wall thereof and each tube adapted for simultaneous parallel receipt and discharge of liquid to be purified;
      2. a layer of resilient fibrous or fabric-like material disposed around the inner surface of each tube of the first plurality of tubes;
      3. a membrane of material which retains certain liquids and allows the liquid to be separated to pass, disposed around the inner surface of the layer of resilient material within each tube of the first plurality of tubes;
      4. a second plurality of rigid support tubes disposed about each of the first plurality of tubes, each of the second plurality of tubes having at least one helical groove disposed on the inner surface thereof; and
   B. at least a second reverse osmosis separator unit, identical in function to the first, connected for receipt of the discharge of any liquid retained by the membrane material of the first plurality of tubes in the first reverse osmosis separator unit, the number of tubes in the first and second separator units and the lengths of the tubes in both separator units being related to the quantity of purified liquid discharged by the each unit in such a way that the pressure throughout the entire device remains uniform.

* * * * *